Aug. 31, 1948.　　H. J. WOOLSLAYER ET AL　　2,448,482
CHAIN COUPLING

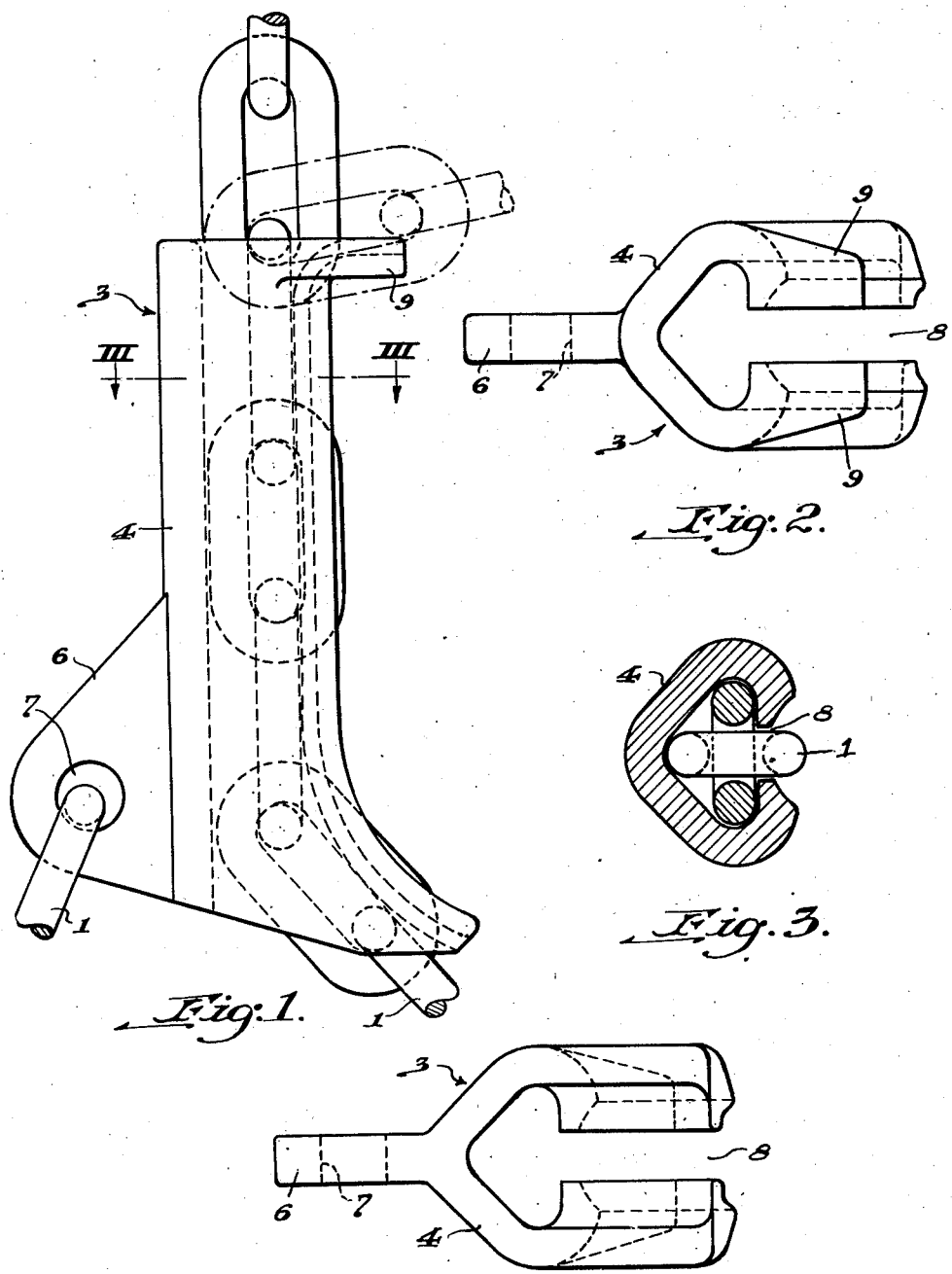

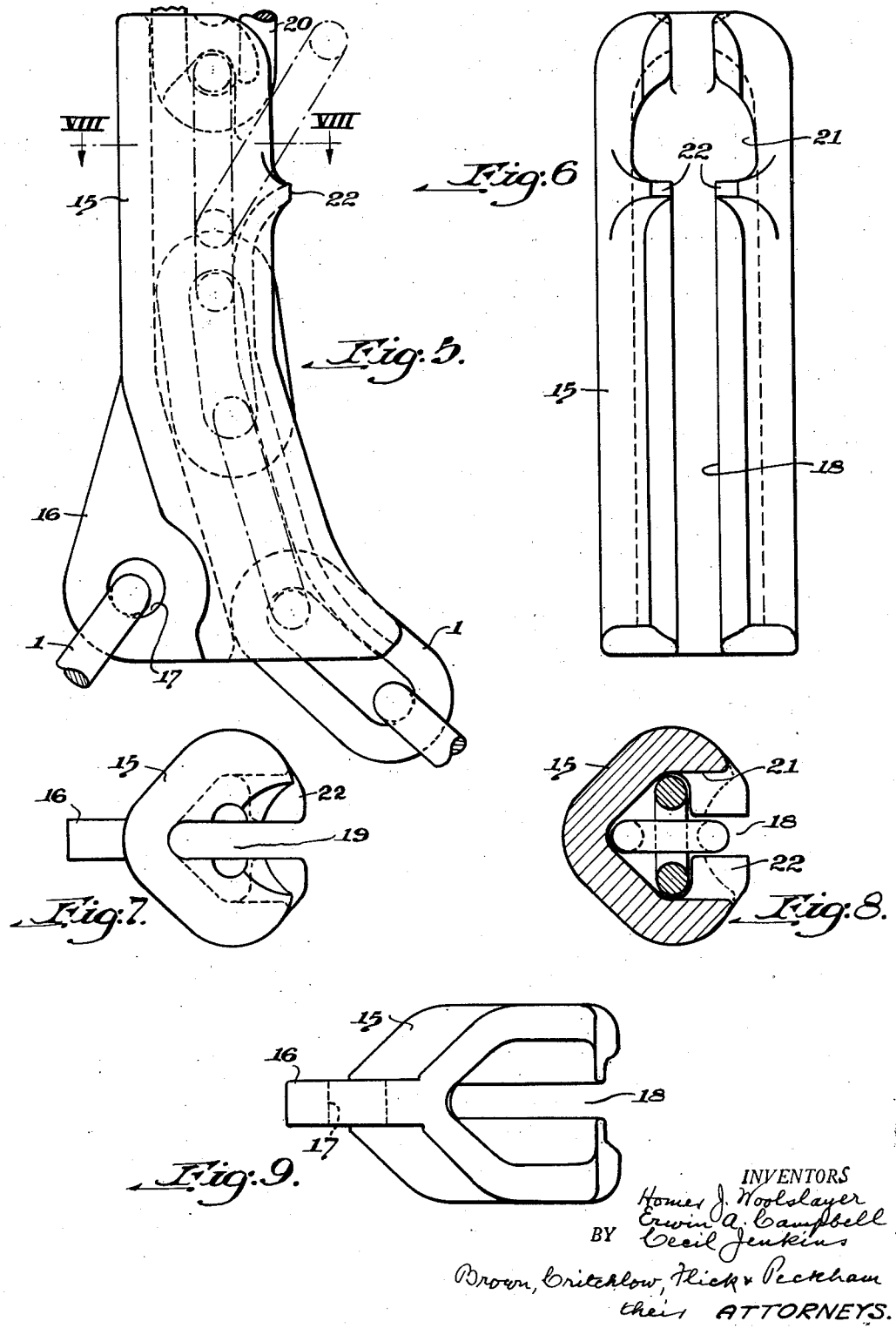

Filed Nov. 30, 1946　　3 Sheets-Sheet 3

Inventors
Homer J. Woolslayer
Erwin A. Campbell
Cecil Jenkins
By Brown, Critchlow, Flick & Peckham
their Attorneys.

Patented Aug. 31, 1948

2,448,482

UNITED STATES PATENT OFFICE 2,448,482

CHAIN COUPLING

Homer J. Woolslayer, Erwin A. Campbell, and Cecil Jenkins, Tulsa, Okla., assignors, by mesne assignments, to Lee C. Moore Corporation, Pittsburgh, Pa., a corporation of Pennsylvania Application November 30, 1946, Serial No. 713,348

5 Claims. (Cl. 24—116)

This invention relates to couplings for taking the place of hooks to connect the ends of chains to intermediate portions thereof in order to to form loops in the chains.

It is common practice in lifting a load by a crane or the like to loop a chain around the load and attach the chain to the crane hook. The loop in the chain is formed by hooking its lower end to an intermediate portion of the chain above the load. Occasionally, when a load is set down temporarily and tension is removed from the chain, the chain hook slips off the chain so that when the crane again attempts to lift the load the chain pulls away from it. Serious accidents have occurred because of this when the load was unbalanced and could fall over.

It is among the objects of this invention to provide a coupling which can take the place of such hooks, which can be applied to a chain easily to form a loop, which cannot become disengaged from the chain accidentally, and one form of which can be allowed to slide along the chain or can be locked against such slippage.

In accordance with this invention the coupling has a tubular body which is attached permanently to one end of a chain. This body is adapted to receive temporarily a length of the chain at any place between the ends of the chain in order to form a loop. To place the chain in or to withdraw it from the body, the side wall of the body has a slot through it extending from one end to the other. In one embodiment of the invention the slot is of substantially uniform width throughout its length, while in another form the major portion of the slot is of uniform width. In both cases, at least the major portion of the slot's length is only wide enough to receive a chain link edgewise. The coupling is hooked onto a chain by inserting one of the links edgewise into one end of the slot and then moving it along the slot until it emerges from the opposite end of the slot. The portion of the chain connected to the end of the link that was inside the body as the link traversed the slot then will extend through the body. To remove the chain from the body the procedure just outlined is reversed. For safety, the coupling may be provided with means to prevent the chain from being removed from one end of it. It also may be formed to allow the chain to be move lengthwise through it, or to lock the chain against such movement.

Figure 11:
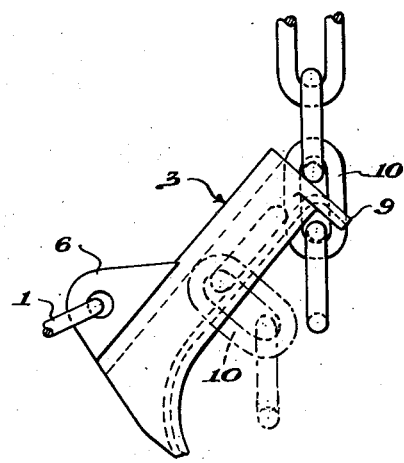
Figure 12:
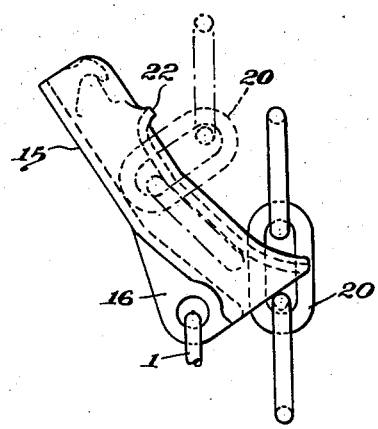
Figure 10:
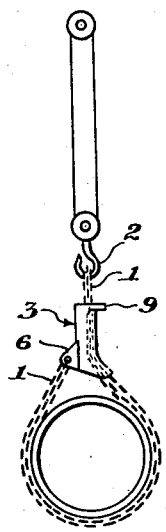

The invention is illustrated in the accompanying drawings in which Fig. 1 is a side view of the coupling connected to a chain; Fig. 2 is an upper end view without the chain; Fig. 3 is a transverse section taken on the line III—III of Fig. 1; Fig. 4 is a lower end view; Fig. 5 is a side view of a modified embodiment of the invention; Fig. 6 is a front view of the coupling; Fig. 7 is an upper end view; Fig. 8 is a transverse section taken on the line VIII—VIII of Fig. 5; Fig. 9 is a lower end view; Fig. 10 is a reduced view of the Fig. 1 coupling on the end of a chain; Fig. 11 is a side view of the coupling being slipped onto the intermediate portion of a chain; and Fig. 12 is a side view of the Fig. 5 coupling being slipped onto the intermediate portion of a chain.

Referring to Fig. 10 of the drawings, a chain 1 is shown provided with a loop in which a load can be placed. The upper end of the chain is suspended from the hook 2 of a crane (not shown). In order to form the loop a coupling 3, attached to the lower end of the chain, is detachably connected to the intermediate portion of the chain as shown. The coupling is shown in detail in Figs. 1 to 4 where it will be seen that its major portion consists of a tubular metal body 4 which has a heavy side wall and is strong and rigid. Welded to the lower portion of what shall be designated herein the rear side of the body is a triangular plate 6 provided with an opening 7 for the reception of one end of the chain to which the coupling is secured. The opposite side of the body is provided with a slot 8 extending from top to bottom and having substantially parallel side walls. This slot is wide enough to receive any link of the chain edgewise, but not wide enough to permit that link to enter the slot when the chain is twisted 90°. The size of the opening through the tubular body can be reduced by making it triangular in cross section, because alternate links in the body can project into the slot, as shown in Fig. 3. The lower portion of the slotted side of the body preferably is curved outwardly so that pull of the chain loop in substantially opposite directions at the lower end of the coupling will not tend to move a link into the lower end of the slot.

The chain is removed from inside the coupling body by sliding one of the links at the bottom of the body edgewise into the lower end of the slot and then upwardly therein until it leaves the top of the body. The lower end of that link; that is, the end connected to the portion of the chain below it, will be disposed outside of the body while the link is moving along the slot. This is the only way the coupling can be separated from the intermediate portion of the chain, because at the top of the body there are a pair of parellel lugs 9 projecting forward from opposite sides of the slot. The space between these lugs is only great enough to receive a link edgewise between them, and, as shown in Fig. 1, the lugs are too long to allow a link (indicated in broken lines at the top of the coupling) whose lower end is inside the body from passing down between the lugs so that the link might slide down the slot and out of its lower end. The lugs therefore prevent a link at the upper end of the coupling body from accidentally entering the upper end of the slot and releasing the coupling.

It follows that the coupling cannot be hooked onto the intermediate portion of the chain by sliding the lower end of the slot across a link, because the lower end of the link would be located inside of the body, and the lugs are too long to permit such a link from passing upwardly between them. The only way the coupling can be applied to the chain is first to slip the lugs across a link 10, as shown in Fig. 11, and then to draw the link down through the slot and out of its lower end. Of course, moving the coupling upwardly on the link will have the same effect as moving the link downwardly in the slot. As shown in Fig. 3, the outside of the coupling body on opposite sides of the slot may be chamfered to fit one end of an outside link when an adjoining link is being slid along the slot, in case the link is short.

It will be seen that with this coupling there is no danger of the lower end of the chain becoming disconnected accidentally from the intermediate portion of the chain and releasing the load. Another feature of this coupling is that it can slide along the chain to tighten the loop around the load.

In the embodiment of the invention shown in Figs. 5 to 9 the coupling has a tubular body 15 of the same cross sectional shape as the one just described. The passage through the body likewise may be straight, but in this case it is shown with its lower portion extending forward at an angle to the upper portion. Projecting from the back side of the lower portion of the body is a plate 16 in which there is an opening 17 for fastening the coupling to the lower end of a chain. The front wall of the body is provided with a slot 18 extending from top to bottom and only wide enough for most of its length to receive a link edgewise only. Unlike the first embodiment, the tubular body of this one has an upper end wall which is provided with a slot 19 the front end of which opens into the upper end of the side wall slot. The two slots preferably are the same width.

As shown in Fig. 12, this coupling is hooked onto a length of chain between the chain ends, in order to form a loop, by sliding the slotted lower front end of the body across a link 20 and either moving the link upwardly in the slot 18 or moving the body downwardly across the link until the link moves into upper end wall slot 19. The links engaging the opposite ends of the link just mentioned are disposed at right angles to that link and therefore can pass neither up nor down through slot 19. This locks the coupling on the chain so that it cannot slide lengthwise of it. In some cases, however, it may be desirable to slide the coupling along the chain to another location. To permit this to be done, the side wall slot 18 is widened near its upper end to provide an opening 21 large enough to allow the chain to slide lengthwise therethrough when the chain is moved down out of engagement with the upper end wall. The chain is kept from catching on the coupling as it slides in or out of this opening by providing the body at the bottom of the opening with outwardly curved projections 22. This coupling therefore can be slid along the chain to any desired position, and then locked in that position by moving links into position to engage the top and bottom of the upper end wall. There is no danger of the coupling accidentally releasing itself from the chain.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

1. A coupling for detachably connecting one end of a chain to an intermediate portion thereof to form a loop, said coupling comprising an upright tubular body adapted to receive a length of the chain's intermediate portion, the side wall of said body having a slot therethrough extending from end to end of the body with at least the major portion of its length only wide enough to receive a chain link edgewise, the lower end of the slotted side of the body curving outwardly away from the portion of the body above it, and a perforated member projecting from the lower part of the opposite side of the body adapted to be connected to said end of the chain.

2. A coupling for detachably connecting one end of a chain to an intermediate portion thereof to form a loop, said coupling comprising a tubular body adapted to receive a length of the chain's intermediate portion, the side wall of said body having a slot therethrough extending from end to end of the body with at least the major portion of its length only wide enough to receive a chain link edgewise, a pair of lugs at opposite sides of one end of said slot projecting laterally from said body, said lugs being spaced apart only far enough to receive a chain link edgewise and being long enough to keep a link connected to the portion of the chain extending out of the opposite end of the body from passing out of the body through the space between the lugs, and said coupling being formed for attachment to said end of the chain.

3. A coupling for detachably connecting one end of a chain to an intermediate portion thereof to form a loop, said coupling comprising a tubular body adapted to receive a length of the chain's intermediate portion, the side wall of said body having a slot therethrough extending from end to end of the body with the major portion of its length only wide enough to receive a chain link edgewise, one end of said body having an end wall provided with a slot through it communicating at one end with the adjoining end of the side wall slot, said end wall slot being only wide enough to receive a link edgewise, whereby the end wall prevents the chain from sliding through it, a portion of said side wall slot adjacent said end wall being wide enough to form an opening through which the chain can slide into and out of the body, and said coupling being formed for attachment to said end of the chain.

4. A coupling for detachably connecting one end of a chain to an intermediate portion thereof to form a loop, said coupling comprising a tubular body adapted to receive a length of the chain's intermediate portion, the side wall of said body having a slot therethrough extending from end to end of the body with the major portion of its length only wide enough to receive a chain link edgewise, one end of said body having an end wall provided with a slot through it communicating at one end with the adjoining end of the side wall slot, said end wall slot being only wide enough to receive a link edgewise, whereby the end wall prevents the chain from sliding through it, a portion of said side wall slot adjacent said end wall being wide enough to form an opening through which the chain can slide into and out of the body, and a perforated member projecting from the opposite end of the body on the side opposite to said wall slot, said member being adapted to be connected to said end of the chain.

5. A coupling for detachably connecting one end of a chain to an intermediate portion thereof to form a loop, said coupling comprising a tubular body adapted to receive a length of the chain's intermediate portion, the side wall of said body having a slot therethrough extending from end to end of the body with at least the major portion of its length only wide enough to receive a chain link edgewise, a pair of lugs at opposite sides of one end of said slot projecting laterally from said body, said lugs being spaced apart only far enough to receive a chain link edgewise and being long enough to keep a link connected to the portion of the chain extending out of the opposite end of the body from passing out of the body through the space between the lugs, and a connecting member projecting from the opposite end of the body on the side opposite to said wall slot for connecting to said end of the chain.

HOMER J. WOOLSLAYER.
ERWIN A. CAMPBELL.
CECIL JENKINS.

REFERENCES CITED

The following references are of record in the file of this patent:

UNITED STATES PATENTS

| Number | Name | Date |
|---|---|---|
| 176,562 | Marie | Apr. 25, 1876 |
| 388,021 | Byrne | Aug. 21, 1888 |
| 919,699 | Davis | Apr. 27, 1909 |
| 1,427,724 | Clay | Aug. 29, 1922 |
| 2,049,710 | Livingston | Aug. 4, 1936 |

FOREIGN PATENTS

| Number | Country | Date |
|---|---|---|
| 190,525 | Great Britain | Dec. 19, 1922 |